United States Patent [19]
Peng

[11] Patent Number: 5,274,730
[45] Date of Patent: Dec. 28, 1993

[54] OPTICAL INTERCONNECTION OF PHOTONIC CIRCUITS

[75] Inventor: Peter Peng, Howell, N.J.

[73] Assignee: AT&T Bell Laboratories, Murray Hill, N.J.

[21] Appl. No.: 971,739

[22] Filed: Nov. 5, 1992

[51] Int. Cl.[5] .............................................. G02B 6/00
[52] U.S. Cl. .................................... 385/134; 385/135
[58] Field of Search ....................... 385/134, 135, 139

[56] References Cited

U.S. PATENT DOCUMENTS

| | | | |
|---|---|---|---|
| 4,749,251 | 6/1988 | Moulin | 385/134 X |
| 5,109,467 | 4/1992 | Hogan et al. | 385/135 |
| 5,133,038 | 7/1992 | Zipper | 385/135 |
| 5,170,455 | 12/1992 | Goosen et al. | 385/146 X |
| 5,204,929 | 4/1993 | Machall et al. | 385/135 |

OTHER PUBLICATIONS

"Orthogonal Packaging for a Photonic Switching System", Y. Satoh et al. Optical Fiber Communication Conference 1992 Technical Digest Series vol. 5, p. 162, Feb. 1992.

Primary Examiner—Frank Gonzalez
Assistant Examiner—Stephen W. Barns
Attorney, Agent, or Firm—Robert P. Marley

[57] ABSTRACT

A technique for interconnecting photonic circuits employing a fixed field of optical couplers situated between adjacent layers of photonic circuits. The coupler field facilitates the direct connection of optical fibers linked to components in one of the adjacent layers of photonic circuits with optical fibers linked to components in another adjacent layer. Each optical coupler within the field is a standard, commercially available optical fiber coupler which mates the optical fibers via a single low-loss connection. In addition, as each of these connectors allows easy connection/disconnection of optical fibers, reconfiguring previous interlayer connections is simplified. In a particular embodiment, the coupler field includes a plurality of individual couplers arranged in a regular geometric pattern upon a panel oriented at a 45° angle with respect to the circuit packs of the adjacent layers. This provides easy access to the couplers, and allows for uncomplicated indexing of each connection.

6 Claims, 3 Drawing Sheets

OPTICAL INTERCONNECTION OF PHOTONIC CIRCUITS

TECHNICAL FIELD

The invention relates to photonic data and information transmission and, more particularly, to the interconnection of photonic circuits situated within a three-dimensional topology.

BACKGROUND OF THE INVENTION

Within photonic communication systems it is desirable to arrange individual circuits in a manner which allows the greatest flexibility of interconnection between them, so as to permit the overall system to be easily reconfigured. In addition, it is also desirable to arrange the individual photonic circuits so that the physical length of any interconnections is kept to a minimum, thereby decreasing inter-circuit transit time and optimizing the transmission rate within the overall communication system.

One such arrangement aimed at achieving these goals, which has gained acceptance in the industry, is edge-to-edge three-dimensional topology. In this topology, photonic circuit packs are arranged in stacked layers, each layer consisting of a parallel grouping of circuit packs. Typically, the circuit packs within a given layer are oriented orthogonally with respect to circuit packs of adjacent layers. Normally, interconnections between the layers are effected via optical fiber jumper cables which directly link a point on a circuit pack within one layer to a point on a circuit pack in another layer. This commonly results in large numbers of optical fiber jumpers running between any two layers within the orthogonal edge-to-edge three-dimensional topology. Jumper interconnection methods have proved expensive from both a material and labor cost stand point, and do not readily lend themselves to easing the complexity of system reconfiguration (large numbers of inter-layer jumpers can prove confusing and cumbersome to work with).

Alternate methodologies of interconnecting the circuit packs within an orthogonal edge-to-edge three-dimensional topology employ low-loss, short-length optical connectors (see "Orthogonal packaging for a photonic switching system", Y. Satoh, M. Kurisaka, T. Sawano, Optical Fiber Communication Conference 1992 Technical Digest Series, Vol. 5, p. 162, Feb. 1992). While these connectors minimize the length of the inter-layer optical fiber links, they introduce two inter-layer optical connections. Each fiber linked to a component on one layer is connected with one end of a short optical fiber, and the other end of that short optical fiber is connected to a fiber linked to a component in another layer. Naturally, optical losses and material costs increase with each additional inter-layer optical connection.

Furthermore, the short-length optical connectors do not offer much flexibility with respect to system reconfiguration. The optical connectors on one circuit pack of a particular layer each mate with particular optical connectors upon a second circuit pack of an adjacent layer. To reconfigure the system, the connections between the optical connectors and the individual components within each circuit pack would have to be physically rerouted. This would involve manually breaking existing optical connections between an optical connector and circuit pack components, and establishing a new connection to an alternate circuit pack component. Typically, such reconfiguring proves to be tedious, time consuming, and expensive.

SUMMARY OF THE INVENTION

The present invention overcomes the deficiencies of prior techniques for interconnecting photonic circuits within a three-dimensional topology by interposing a fixed field of optical couplers between adjacent layers of photonic circuits. The coupler field facilitates the direct connection of optical fibers linked to components in one of the adjacent layers of photonic circuits with optical fibers linked to components in another adjacent layer. Each optical coupler within the field is a standard, commercially available optical fiber coupler which mates the optical fibers via a single low-loss connection. In addition, as each of these connectors allows easy connection/disconnection of optical fibers, reconfiguring previous interlayer connections is simplified.

In a particular embodiment of the invention employed within orthogonal edge-to-edge three-dimensional topology, the coupler field includes a plurality of individual couplers arranged in a regular geometric pattern upon a panel oriented at a 45° angle with respect to the circuit packs of the adjacent layers. This provides easy access to the couplers, and allows for uncomplicated indexing of each connection.

DETAILED DESCRIPTION OF THE INVENTION

Figure 1:
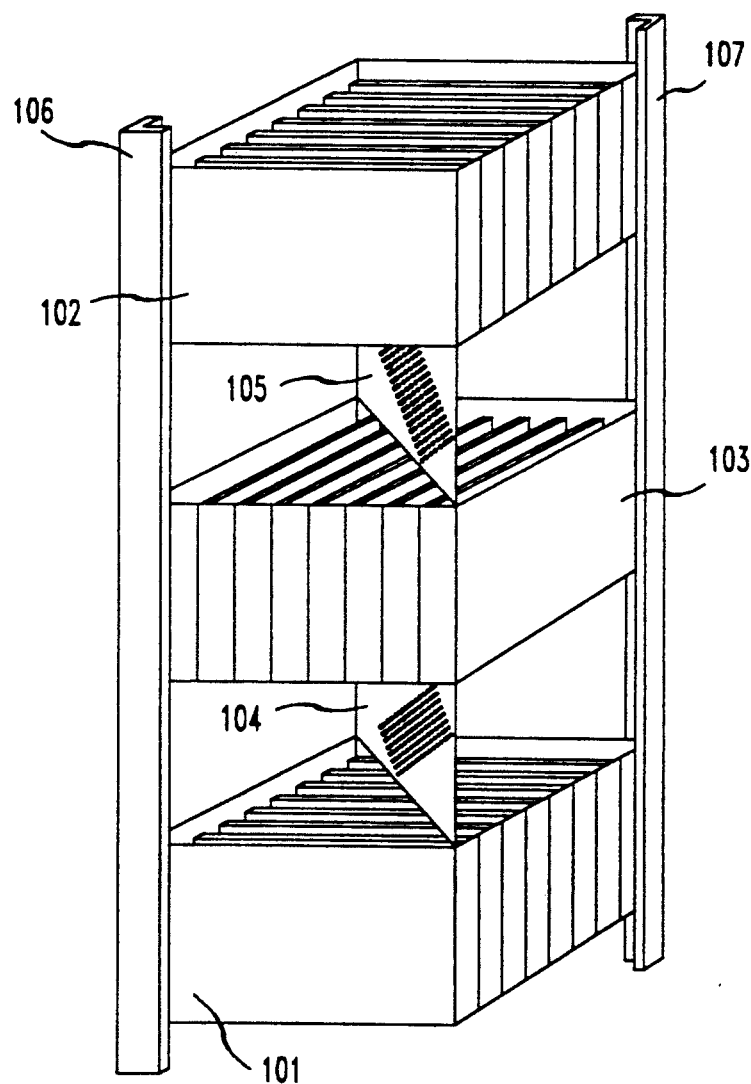
FIG. 1 shows, in simplified diagram form, a preferred embodiment of the invention employed within a photonic switching system.

FIG. 1 shows, in simplified form, a preferred embodiment of the invention as it would be employed within a three-layer sixteen-by-sixteen channel photonic switching system having a orthogonal three-dimensional topology. Specifically, shown is photonic switch input module layer ("SWIN") 101, photonic switch output module layer ("SWOUT") 102, photonic switch center module layer ("SWCS") 103, and interconnection panels 105 and 104. As is illustrated, SWOUT 102, SWIN 101, and SWCS 103 (all of which are mounted between support members 106 and 107) each consist of eight individual photonic circuit packs. All photonic circuits packs within a given module are oriented parallel to one another, and the circuit packs of one module are orthogonally oriented with respect to the circuit packs of any neighboring module. Interconnection panels 104 and 105 are interposed between the modules and situated so that the plane of each is oriented at a 45° angle with respect to the circuit packs within the adjacent modules. This angle allows a technician to gain equal access to all of the circuit packs within the adjacent modules.

Sixteen optical fibers originate from each of the circuit packs within SWIN 101, and a set of sixteen optical fibers terminate in each of the circuit packs within SWOUT 102 (the optical fibers are not shown in FIG. 1). Each of these circuit packs, which supports two information channels, produces eight separate identical signals for each of these channels—resulting in sixteen output optical fibers being associated with each individual circuit pack. Such redundant signal generation is dictated by the standard architecture of photonic telecommunication networks. SWCS 103 provides a sixteen by sixteen channel cross connect capability, and each of the circuit packs is coupled to a total of 32 optical fibers (sixteen from SWIN 101 and sixteen from SWOUT 102). Interconnect panels 105 and 104 provide the means by which this coupling is accomplished.

Figure 2:
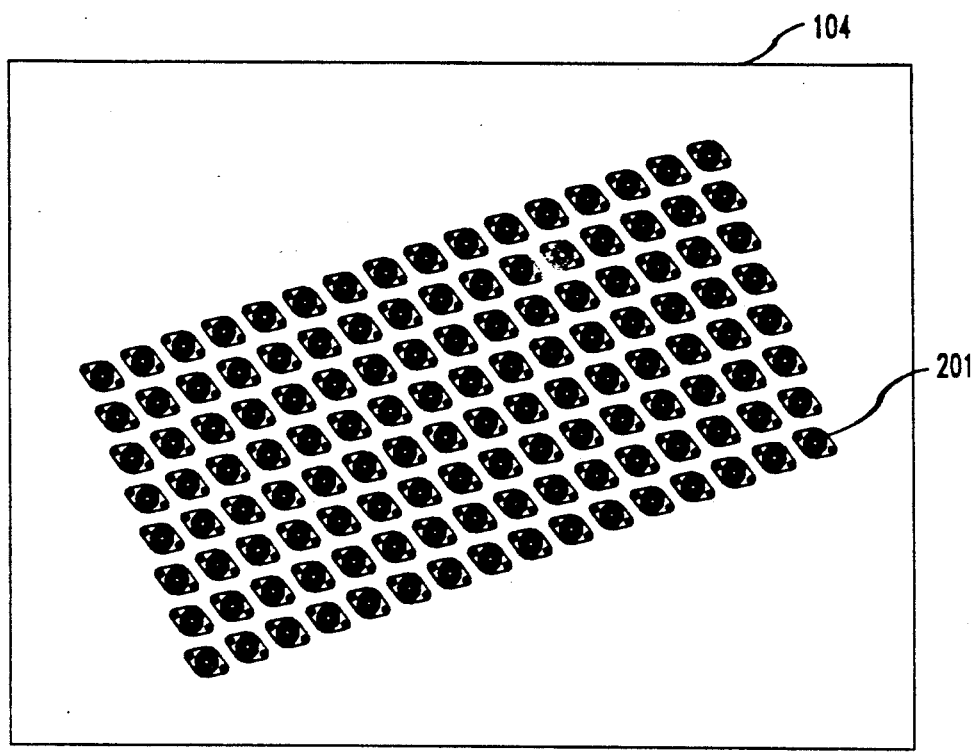
FIG. 2 shows a front plane view of one of the interconnection panels within the photonic switching system of FIG. 1.
Figure 3:
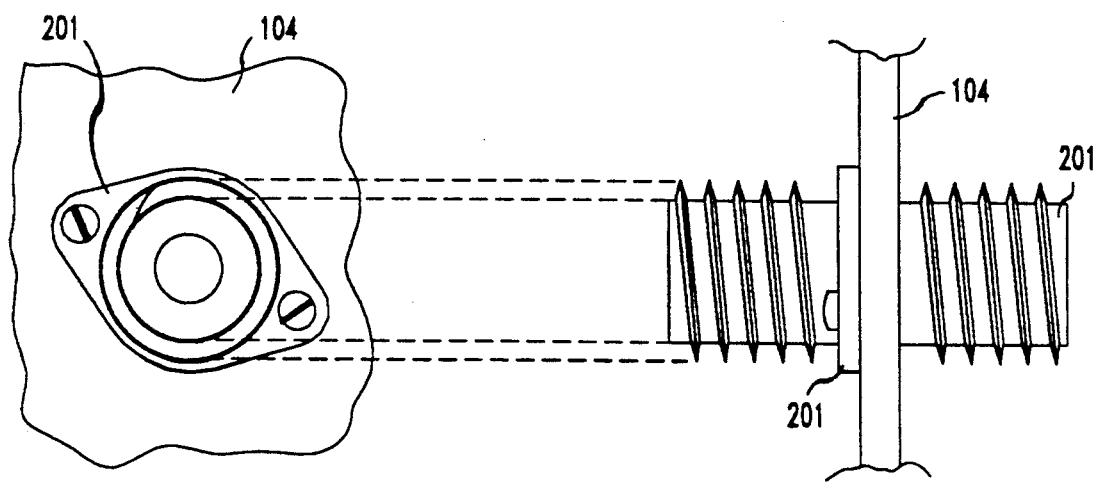
FIG. 3 provides front plane and side views of an individual optical coupler upon the interconnection panel of FIG. 2.

Interconnection panels (104, 105) each include a number of optical couplers adapted for mating two optical fibers. FIG. 2 provides a front plane view of interconnection panel 104. As is shown, the optical couplers are mounted upon the panel so that one connection of an optical fiber may be effected from one side of the panel, and second connection to another optical fiber may be effected from the opposite side of the panel. In this particular embodiment of the invention, 128 2.5 mm FC-type optical couplers (such as the 501506-type manufactured by AMP Incorporated of Harrisburg, Pa.) are mounted in an eight row by sixteen column, rhomboid pattern upon each interconnection panel. A detailed view of an individual optical coupler (201) mounted upon interconnection panel. A detailed view of an individual optical coupler (201) mounted upon interconnection panel 104 is shown in FIG. 3.

Figure 4:
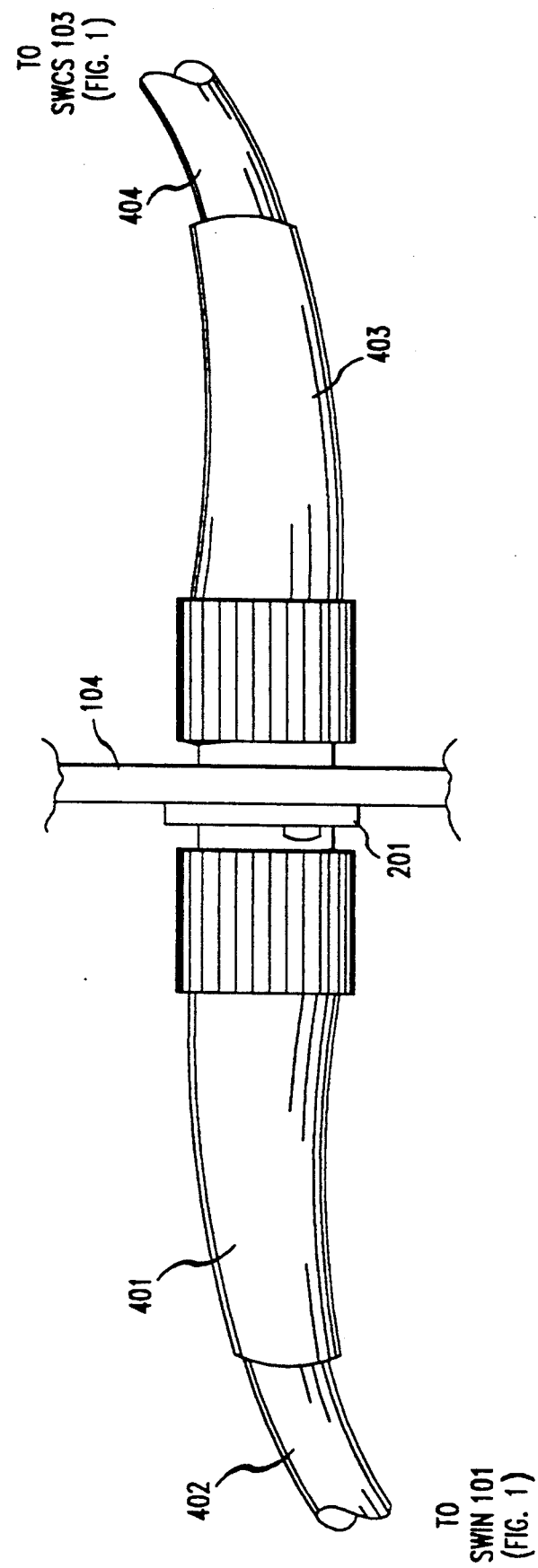
FIG. 4 provides a side view of the optical coupler of FIG. 4 mated to a pair of optical fiber plug assemblies.

Each of the optical fibers originating from SWOUT 102, SWIN 101, and SWCS 103 terminates in a 2.5 mm FC-type optical fiber plug assembly (such as the 502156-type manufactured by AMP Incorporated of Harrisburg, Pa.). These assemblies allow quick and reliable connections to be effected with the optical couplers upon interconnection panel 104. As shown in FIG. 4, plug assembly 401, linked to a circuit pack within SWIN 101 by optical fiber 402, is mated to one side of optical coupler 201. The opposite side of optical coupler 201 is mated to plug assembly 403, which is linked to a circuit pack within SWCS 103 by optical fiber 404. This plug assembly-to-plug assembly mating facilitated by optical coupler 201 requires only one inter-layer optical connection to be made, thereby minimizing optical losses within the switching system.

To simplify the indexing of the fiber optic plug assemblies mated to interconnection panel 104, the sixteen assemblies associated with a given photonic circuit pack within SWIN 101 are mated with two adjacent columns of optical couplers on one side of the panel. One of the columns is mated with the eight assemblies linked to circuits within the pack associated with one of the communication channels supported by the pack. The other column is mated with assemblies linked to circuits within the pack associated with the other communication channel supported by the pack. Other circuit packs within SWIN 101 are mated to pairs of coupler columns in a fashion similar to that described above; each column being mated to the eight assemblies associated with a single channel supported by each of the packs. All of the connections between the assemblies associated with SWIN 101 and the optical couplers are effected from the same side of interconnection panel 104.

The opposite end of each optical coupler mounted upon interconnection panel is then mated to an assembly linked to the circuit packs within SWCS 103. For maximum cross-connect flexibility, it is usually desirable to route each of the eight redundant signals associated with any given communication channel from a circuit pack within SWIN 101 to a different circuit pack within SWCS 103. To accomplish this, and maintain a simplified indexing scheme of the fiber optic plug assemblies mated to interconnection panel 104, the sixteen assemblies associated with a given photonic circuit pack within SWIN 103 are mated to a single row of optical couplers on the panel. The other seven circuit packs within SWCS 103 are likewise mated with the remaining seven rows of couplers; each row being mated to the sixteen assemblies associated with each of the circuit packs. Naturally, all of the connections between the assemblies associated with SWIN 101 and the optical couplers are effected from the same side of interconnection panel 104.

Connections between SWOUT 102, interconnection panel 105, and SWCS 103 are effected in a manner similar to that described above. Naturally, the specific interconnection pattern between SWOUT 102 and SWCS 103 need not exactly mirror that between SWIN 101 and SWCS 103.

While it is believed that the above described scheme for interconnecting the modules is the most straight forward and efficient, the interconnection panels are in no way limited to this ordered row and column mating procedure. The optical couplers upon the interconnection panels can be mated to optical fiber from any circuit pack, within any module-provided a plug assembly linked to that circuit pack can physically reach the particular coupler. This complete interconnection freedom allows for quick and easy system reconfiguration.

It will be understood that the particular embodiments described above are only illustrative of the principles of the present invention, and that various modifications could be made by those skilled in the art without departing from the scope and spirit of the present invention, which is limited only by the claims that follow. One such modification might include employing optical coupler and plug assemblies other than FC-type. Other modifications might include arranging the optical coupler field upon an interconnection panel in a radial, or other geometric pattern. The plane of the coupler field might also be oriented at an angle other than 45° with respect to the circuit packs of adjacent modules.

I claim:

1. An apparatus for optically interconnecting a first layer and a second layer of photonic circuits positioned within a three-dimensional topographical arrangement, comprising:

an interconnection panel mounted within said three-dimensional topographical arrangement, and positioned intermediate said first layer and said second layer of photonic circuits, said interconnection panel having a first exposed surface and a second exposed surface;

a plurality of optical couplers mounted upon said interconnection panel adapted to facilitate the mating of a first optical fiber linked to a circuit within said first layer and a second optical fiber linked to a circuit within said second layer, each of said plurality of optical couplers being mounted upon said interconnection panel so that the coupler adapted to mate with said first optical fiber projects from said first exposed surface of said interconnection panel, and the coupler adapted to mate with said second optical fiber projects from said second exposed surface of said interconnection panel.

2. The apparatus of claim 1 wherein said interconnection panel is positioned so that the plane of said first exposed surface and the plane of said second exposed surface are situated diagonally with respect to the plane of the circuits within said first and second layers.

3. An apparatus for optically interconnecting a first layer and a second layer of photonic circuits positioned within a three-dimensional topographical arrangement, wherein the plane of the circuits of said first layer are orthogonally oriented with respect to the plane of the circuits of said second layer, comprising:

a planar interconnection panel having a first exposed surface and a second exposed surface, said planar interconnection panel being mounted within said three-dimensional topographical arrangement, and positioned intermediate said first layer and said second layer of photonic circuits so that the plane of said interconnection panel is situated diagonally with respect to the plane of the circuits within said first and second layers;

a plurality of optical couplers mounted upon said first and said second exposed surfaces adapted to facilitate the mating of a first optical fiber linked to a circuit within said first layer and a second optical fiber linked to a circuit within said second layer.

4. The apparatus of claim 3 wherein said interconnection panel is positioned so that the plane of said interconnection panel is situated at a 45° angle with respect to the plane of the circuits within said first and second layers.

5. An apparatus for optically interconnecting a first layer and a second layer of photonic circuits positioned within a three-dimensional topographical arrangement, wherein the plane of the circuits of said first layer are orthogonally oriented with respect to the plane of the circuits of second layer, comprising:

a planar interconnection panel having a first exposed surface and a second exposed surface, said planar interconnection panel being mounted within said three-dimensional topographical arrangement intermediate said first layer and said second layer of photonic circuits so that the plane of said interconnection panel is situated diagonally with respect to the plane of the circuits within said first and second layers;

a plurality of optical couplers mounted upon said interconnection panel adapted to facilitate the mating of a first optical fiber linked to a circuit within said first layer and a second optical fiber linked to a circuit within said second layer, each of said plurality of optical couplers being mounted upon said interconnection panel so that the coupler adapted to mate with said first optical fiber projects from said first surface of said interconnection panel, and the coupler adapted to mate with said second optical fiber projects from said second surface of said interconnection panel.

6. The apparatus of claim 5 wherein said interconnection panel is positioned so that the plane of said interconnection panel is situated at a 45° angle with respect to the plane of the circuits within said first and second layers.

* * * * *